(12) United States Patent
Banerjee

(10) Patent No.: US 10,611,971 B2
(45) Date of Patent: Apr. 7, 2020

(54) FOG COMPUTING FOR RAISING DELAYED COKER YIELDS

(71) Applicant: HONEYWELL INTERNATIONAL INC., Morris Plains, NJ (US)

(72) Inventor: Soumendra Mohan Banerjee, New Delhi (IN)

(73) Assignee: Honeywell International Inc., Morris Plains, NJ (US)

( * ) Notice: Subject to any disclaimer, the term of this patent is extended or adjusted under 35 U.S.C. 154(b) by 205 days.

(21) Appl. No.: 15/927,752

(22) Filed: Mar. 21, 2018

(65) Prior Publication Data

US 2019/0292469 A1  Sep. 26, 2019

(51) Int. Cl.
| | |
|---|---|
| *C10G 7/12* | (2006.01) |
| *G05B 19/05* | (2006.01) |
| *C10G 55/04* | (2006.01) |
| *G05D 7/06* | (2006.01) |

(52) U.S. Cl.
CPC ............. *C10G 55/04* (2013.01); *G05B 19/05* (2013.01); *G05D 7/0635* (2013.01); *C10G 2300/1077* (2013.01); *C10G 2300/4012* (2013.01); *G05B 2219/1214* (2013.01); *G05B 2219/15057* (2013.01)

(58) Field of Classification Search
CPC .. C10G 7/12; C10G 9/005; C10G 2300/4012; G05B 19/05; B01J 2219/00006
See application file for complete search history.

(56) References Cited

U.S. PATENT DOCUMENTS

| | | | |
|---|---|---|---|
| 4,518,487 A | 5/1985 | Graf et al. | |
| 2009/0127090 A1* | 5/2009 | Ganji | ...................... C10B 33/00 201/31 |

OTHER PUBLICATIONS

C. A. Depew et al., Evaluation of Alternative Control Strategies for Delayed Coker by Dynamic Simulation in Proceedings of the 1988 American Control Conference, pp. 240-246 (1988).*

* cited by examiner

*Primary Examiner* — Randy Boyer

(57) ABSTRACT

A method of operating a refinery including at least one coke drum coupled to a coker fractionator. A pump characteristics curve is provided for a fractionator bottom pump coupled to the coker fractionator comprising a net positive suction head required (NPSHr) curve as a function of a pump flow rate. Fog computing utilizes the pump characteristics curve along with at least one sensed input parameter including a real-time value for the pump flow rate to control the fractionator bottom pump to dynamically control a column pressure (Pc) in the coker fractionator. A reduction in Pc is obtained that reduces an available NPSH (NPSHa) which lessens a difference between the NPSHa and the NPSHr.

12 Claims, 3 Drawing Sheets

FOG COMPUTING FOR RAISING DELAYED COKER YIELDS

FIELD

Disclosed embodiments relate to control of oil refining processes.

BACKGROUND

A coker or coker unit is an oil refinery processing unit which converts residual feed oil from a vacuum distillation column into low molecular weight hydrocarbon gases, naphtha, light and heavy gas oils, and petroleum coke. The process thermally cracks long chain hydrocarbon molecules in a residual oil feed into shorter chain molecules leaving behind the excess carbon in the form of petroleum coke. A delayed coker is a particular type of coker unit where the process comprises heating the residual oil feed to its thermal cracking temperature in a multi-parallel pass furnace which thermally cracks the long chain heavy carbon and hydrogen molecules of the residual oil into coker gas oil and petroleum coke.

Cracking begins in the coker furnace which includes a heater, where there are multiple coke drums, with a coker furnace for each pair of coke drums. The coker fractionator receives feedstock directly from the coke drum and separates the feedstock and sour 'cracked' gas and liquids from the coke drum.

Refiners worldwide seek to increase the liquid product yield from existing delayed coking units. For a particular recycle ratio (fresh feed+recycle)/fresh feed) and feed continuous catalyst regeneration (CCR) content the coke yield is normally proportional to the operating column pressure of the coke drum. The lower the operating column pressure in the coke drum the better the liquid yield.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize in a delayed coker unit 100 such as shown in FIG. 1 the coke drum's 120 operating column pressure (Pc) normally floats with the fractionator reflux drum pressure (Po) at the top of the receiver where a pressure controller 145 (shown as a programmable logic controller (PLC) controller) is located. One of the factors that prevents lowering of the coker fractionator's top operating pressure ($P_T$) beyond a certain value is the net positive suction head (NPSH) pressure requirement for the fractionator bottom pump 126 which is one of the key pieces of equipment in the delayed coker unit 100. This pump generally operates at a relatively high temperature of 350° C. to 400° C., and also has to develop a high discharge pressure of around 30 to 35 Kg/cm$^2$ g. In order to operate safely, refiners normally operate the coker fractionator 125 at a sufficiently high pressure so that there is a gap (difference) between the NPSH pressure required by the fractionator bottom pump 126 (NPSHr) and the NPSH pressure that is available (NPSHa). Hence once fixed, conventionally refinery operators do not adjust Po any further.

Fog computing (also known as fog analytics) applied to a coking unit in this Disclosure solves the problem of low distillate yield by enabling the gap between the NPSHr and the NPSHa in an oil refinery to be reduced to lower the coke drum's Pc, which increases the liquid distillate yields. As used herein, fog computing is an architecture that extends cloud computing and services to the edge for edge computing of the devices in the coker unit, including computations regarding edge devices in the coking unit, such as the coker fractionator 125 and fractionator bottom pump 126 in FIG. 1. Similar to cloud computing, fog computing provides data, computing, storage, and application services to end-users. The distinguishing fog computing characteristics are its proximity to end-users, its dense geographical distribution, and its support for mobility. Services are hosted at the network edge or by end devices. By doing so, fog computing reduces service latency, and improves operation of the coking unit.

One disclosed embodiment comprises a method of operating a refinery including at least one coke drum coupled to a coker fractionator. A pump characteristics curve is provided for a fractionator bottom pump coupled the coker fractionator comprising a NPSHr curve as a function of pump flow rate. For a particular operating condition the flow rate of the pump is fixed which hence fixes the static head and inlet line frictional head loss for the fractionator bottom pump. Thus it is recognized the NPSHa is directly proportional to the pressure at the fractionator bottom pump. Fog computing is employed utilizing the pump characteristics curve along with at least one sensed input parameter including a real-time value for the pump flow rate to control the pumping of the fractionator bottom pump to dynamically control a Pc in the coker fractionator. A reduction in the Pc reduces the NPSHa which lessens a gap (difference) between the NPSHa and the NPSHr.

DETAILED DESCRIPTION

Figure 1:
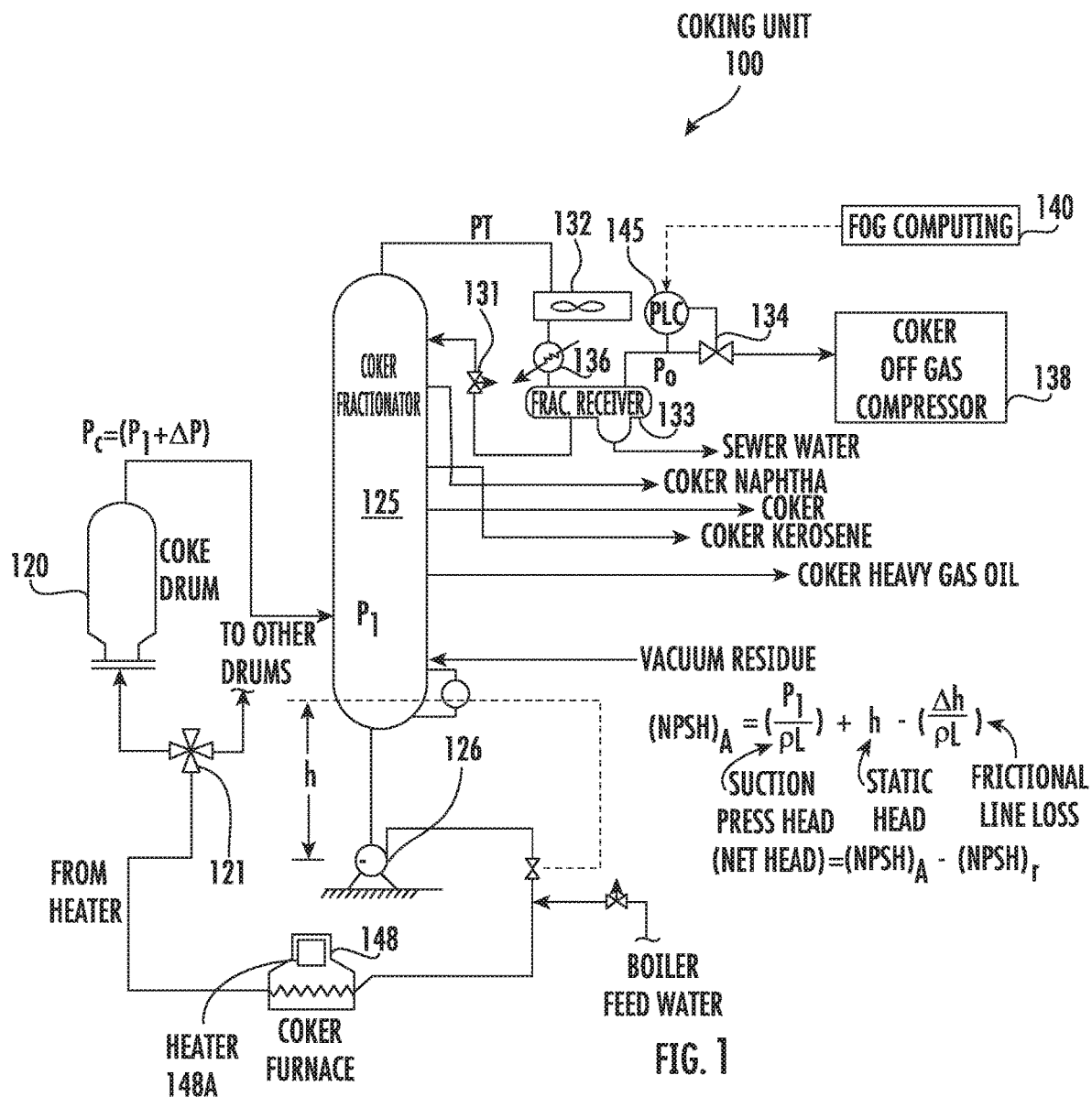
FIG. 1 is a schematic flow diagram of a delayed coking unit including a disclosed fog computing block coupled to a controller shown as a PLC controller which provides control signals for controlling the fractionator's Pc.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

As used herein an industrial process facility runs an industrial process involving a tangible material that disclosed embodiments apply. For example, oil and gas, chemical, beverage, pharmaceutical, pulp and paper manufacturing, petroleum processes, electrical, and water. An industrial process facility is distinct from a data processing system that only performs data manipulations.

FIG. 1 is a schematic flow diagram of a delayed coking unit 100 including a disclosed fog computing block 140 having an output coupled to control a pressure controller 145 shown as a PLC, which provides control signals to control a valve 134 coupled to a coker off gas compressor 138 for controlling the coker fractionator's 125 $P_T$. Unlike cloud operation, the fog computing block 140 pushes intelligence down to the local area network (LAN) level of network architecture in the delayed coking unit 100, which may comprise an Ethernet network. The coker fractionator's 125 $P_T$ is =$P_0$+the pressure drop across the fractionator overhead air condenser 132, and below that is a water condenser 136. A coke drum is shown as 120 where it is understood there will generally be a plurality of coke drums in the delayed coking unit 100. Known coker units in contrast do not use control based on fog computing to accurately control the $P_T$ of the coker fractionator 125 to maximize product yields.

The fog computing block 140 as known in the art, may be implemented by hardware or by software, or more by a combination of hardware and software. Regarding hardware-based implementations, equations can be converted into a digital logic gate pattern, such as using VHDL (a Hardware Description Language) that can then be realized using a programmable device such as a field-programmable gate array (FPGA) or a dedicated application-specific integrated circuit (ASIC) to implement the needed logic gate pattern shown as hardware including digital logic. Regarding software-based algorithm implementations, firmware code stored in an associated memory can be implemented by a processor. The processor can comprise a digital signal processor (DSP), a microcontroller, an application specific integrated circuit (ASIC), a general processor, or any other combination of one or more integrated processing devices.

A 4-way valve 121 is shown coupled between the coke drum 120 and a coker furnace 148 including a heater 148a that is used to divert feed to other coke drums. The fractionator bottom pump 126 provides pumping for the coker fractionator 125. A reflux control valve for the overhead reflux to the coker fractionator 125 is shown as 131. A fractionator overhead air condenser is shown as 132. A fractionator overhead receiver 133 is shown coupled to the reflux control valve 131.

The key operating parameters for the delayed coking unit 100 include the Pc and the coker furnace outlet temperature ($T_1$). The fractionator bottom pump's 126 pressure ($P_1$) is equal to $P_0$ (being the pressure at the top of the receiver) minus a pressure change $\Delta P_1$ due to a pressure loss in the column" overhead circuit (the condensers) plus the pressure drop in the column (trays in the column). $P_C$ is equal to the fractionator bottom pump's 126 pressure ($P_1$) minus the pressure change ($\Delta P$) due to a frictional loss from the coke drum 120 to the coker fractionator 125.

The NPSHr curve as a function of the pump flow rate for the fractionator bottom pump 126 can be obtained from the pump manufacturer. The fractionator bottom pump's 126 flow rate that is set by the level in the coker fractionator 125 bottom section. For a particular operating condition the flow rate of the fractionator bottom pump 126 is fixed and hence the static head pressure and inlet line frictional head loss for the fractionator bottom pump 126. See the equations below, where $\rho$ represents the density of the liquid being pumped and h the static head pressure.

$$NPSHa=(P_1/\rho)+h-(\Delta P_1/\rho)$$

where the first term in the NPSHa equation represents the head pressure due to suction pressure ($P_1$ at the fractionator bottom pump 126), the second term in the NPSHa equation represents the static head pressure available due to the height difference between the column bottom line and fractionator bottom pump 126 center line, and the third term in the NPSHa equation represents the static head pressure loss due to friction loss in the suction line.

$$\text{Net head pressure}=NPSHa-NPSHr$$

Thus NPSHa is directly proportional to the Pc which changes when the fractionator's $P_T$ changes. If Pc is reduced, the NPSHa will be reduced, and hence the gap (difference) between NPSHa and NPSHr is lessened.

Through fog computing provided by the fog computing block 140 and by using the pump characteristics curve for the fractionator bottom pump 126, this pressure gap can be better minimized for different pump flow rates. This enables refiners to operate the coke drum 120 at a lower pressure that would be possible by fixing a minimum gap between the NPSHa and the NPSHr.

A more robust model for the fog computing block 140 for controlling the fractionator bottom pump 126 can be implemented by monitoring other sensed parameters besides the pump flow rate including noise, temperature increase, current drawn, and vibration by using appropriate sensors. Noise refers to pump runtime noise which changes if the fractionator bottom pump cavitates. The temperature increase results due to an increase in pressure of the fluid across the pump, where the temperature also goes up. The current drawn by the fractionator bottom pump indicates the power the pump is currently generating. Pump vibration indicates unstable operation, such as due to low NPSH.

The fog computing block 140 runs data analytics based on past operating data (stored in a data historian) and these current parameters help identify conditions for which the fractionator bottom pump 126 has developed operating issues to make sure that the pump always operates in the safe zone while reducing the gap between NPSHa and NPSHr. This is a low latency operation as the bottom pump 126 needs to stop when some critical operating parameters are hit. Performing this computation on the cloud as opposed to the disclosed fog computing block 140 generally involves sending a lot of data to the cloud and then getting it back to enable taking action. This time lag is recognized in this Disclosure to not be acceptable for critical equipment such as the fractionator bottom pump 126. Hence disclosed data processing is implemented on the edge by the fog computing block 140.

Figure 2:
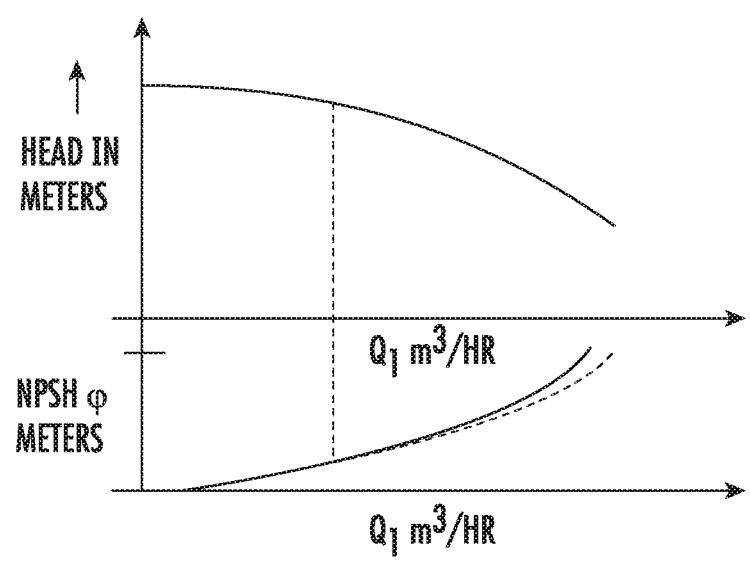
FIG. 2 shows an example plot of the head (in meters) and its relation to the NPSH difference that is typical for generally any centrifugal pump.

FIG. 2 show an example plot of the head (in meters) and its relation to the NPSH difference. Fog computing can use parameters including current drawn, temperature, vibration, suction pressure and past operating data to decide the minimum NPSH that the fractionator bottom pump 126 needs to run satisfactorily for any particular flowrate.

Figure 3:
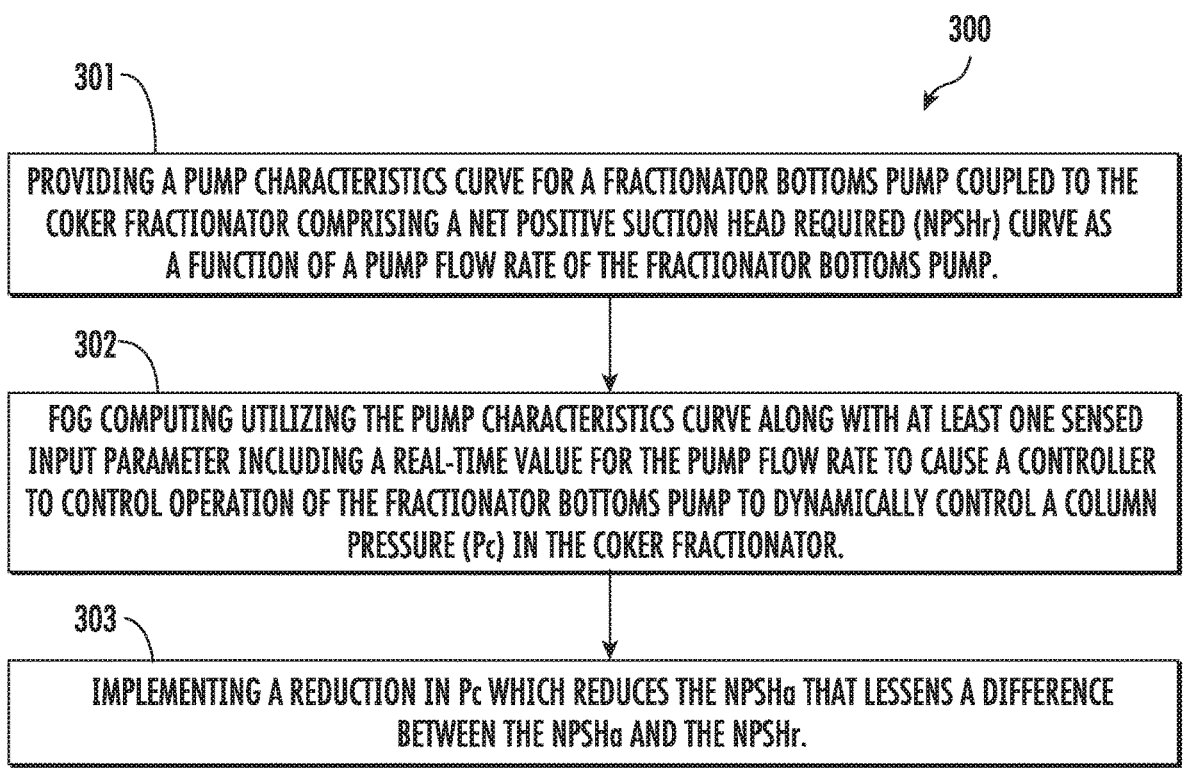
FIG. 3 is a flow chart that shows steps in a method of controlling a coking process, according to an example embodiment.

FIG. 3 is a flow chart that shows steps in a method 300 of operating a refinery including at least one coke drum 120 coupled to a coker fractionator 125 running a coking process. Step 301 comprises providing a pump characteristics curve for a fractionator bottom pump 126 coupled to the coker fractionator 125 comprising an NPSHr curve as a function of pump flow rate. For a particular coker process operating condition the flow rate of the fractionator bottom pump 126 is fixed and hence the static head and inlet line frictional head loss for the fractionator bottom pump 126. Thus the NPSHa is directly proportional to the pressure at the fractionator bottom pump 126.

Step 302 comprises fog computing block 140 utilizing the pump characteristics curve along with at least one sensed input parameter including a real-time value for the pump flow rate to cause a pressure controller 145 to control operation of the fractionator bottom pump 126 by adjusting the valve 134 located on the suction line of the coker off gas compressor 138 to dynamically control a Pc in the coker fractionator 125. Step 303 comprises implementing a reduction in Pc which reduces the NPSHa that lessens a difference between the NPSHa and the NPSHr. This helps to reduce the fractionator bottom pump 126 pressure ($P_1$) as well as the Pc of the coke drum 120.

Disclosed methods can also be used for other process units and equipment. For example, for controlling vacuum column bottom pumps, and fluid catalytic cracking unit (FCCU) main column bottom pumps or other uses where precise control of some parameters such as amperage and vibration can increase desired product yields.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method of operating a refinery including at least one coke drum coupled to a coker fractionator, comprising:
   providing a pump characteristics curve for a fractionator bottom pump coupled to said coker fractionator comprising a net positive suction head required (NPSHr) curve as a function of a pump flow rate for said fractionator bottom pump, and
   fog computing utilizing said pump characteristics curve along with at least one sensed input parameter including a real-time value for said pump flow rate to control said fractionator bottom pump to dynamically control a column pressure (Pc) in said coker fractionator,
   wherein a reduction in said Pc reduces an available NPSH (NPSHa) which lessens a difference between said NPSHa and said NPSHr.

2. The method of claim 1, wherein said sensed input parameter further comprises at least one of a noise, a temperature increase, a current drawn, and a vibration of said fractionator bottom pump.

3. The method of claim 1, wherein said sensed input parameter further comprises a plurality of noise, a temperature increase, a current drawn, and a vibration of said fractionator bottom pump.

4. The method of claim 1, wherein said control of said fractionator bottom pump is through a programmable logic controller (PLC) coupled to a valve that is between a fractionator receiver and a coker off-gas compressor.

5. The method of claim 1, wherein said fog computing is implemented as firmware run by a processor.

6. The method of claim 1, wherein said fog computing is implemented in hardware comprising logic gates.

7. The method of claim 1, wherein said fog computing further utilizes past operating data for said fractionator bottom pump for said dynamical control of said Pc.

8. A coker system, comprising:
   at least one coke drum coupled to a coker fractionator that are heated by a coker furnace, wherein said coker fractionator is pumped by a fractionator bottom pump;
   a fog computing block for providing fog computing utilizing a pump characteristics curve for said fractionator bottom pump comprising a net positive suction head required (NPSHr) curve as a function of a pump flow rate of said fractionator bottom pump along with at least one sensed input parameter including a real-time value for said pump flow rate to control said fractionator bottom pump to dynamically control a column pressure (Pc) in said coker fractionator,
   wherein a reduction in said Pc reduces an available NPSH (NPSHa) which lessens a difference between said NPSHa and said NPSHr.

9. The system of claim 8, wherein said sensed input parameter further comprises at least one of a noise, a temperature increase, a current drawn, and a vibration of said fractionator bottom pump.

10. The system of claim 8, further comprising a programmable logic controller (PLC) having an input coupled to an output of said fog computing block for said control of said fractionator bottom pump coupled to a valve that is between a fractionator receiver and a coker off-gas compressor.

11. The system of claim 8, wherein said fog computing block is implemented as firmware run by a processor.

12. The system of claim 8, wherein said fog computing block is implemented in hardware comprising logic gates.

* * * * *